United States Patent
Joret et al.

(10) Patent No.: US 6,387,515 B1
(45) Date of Patent: May 14, 2002

(54) TRANSPARENT SUBSTRATE COMPRISING AN ANTIREFLECTION COATING

(75) Inventors: Laurent Joret, Paris; David Lebellac, Courbevoie, both of (FR); Marc Maurer, Verviers (BE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/468,093

(22) Filed: Dec. 21, 1999

(30) Foreign Application Priority Data

Dec. 21, 1998  (FR) ............................................. 98 16118

(51) Int. Cl.$^7$ .......................... B32B 15/00; B32B 17/06
(52) U.S. Cl. ...................... 428/432; 428/216; 428/428; 428/432; 428/433; 428/434; 428/336; 428/697; 428/698; 428/699
(58) Field of Search ................... 428/216, 428, 428/432, 433, 434, 336, 697, 698, 699

(56) References Cited

U.S. PATENT DOCUMENTS

| | | | |
|---|---|---|---|
| 3,378,396 A | | 4/1968 | Zaromb |
| 4,440,822 A | * | 4/1984 | Gordon ....................... 428/216 |
| 5,234,748 A | * | 8/1993 | Demiryont et al. .......... 428/216 |
| 5,891,556 A | | 4/1999 | Anderson et al. ............ 428/216 |
| 5,935,702 A | | 8/1999 | Macquart et al. ............ 428/336 |
| 6,068,914 A | * | 5/2000 | Boire et al. .................. 428/216 |
| 6,174,599 B1 | * | 1/2001 | Boire et al. .................. 428/336 |

FOREIGN PATENT DOCUMENTS

| | | |
|---|---|---|
| EP | 0 519 690 A1 | 12/1992 |
| EP | 0722913 | * 12/1994 |
| EP | 0 718 250 A2 | 6/1996 |
| EP | 0 728 712 A1 | 8/1996 |
| EP | 0728712 | * 8/1996 |
| EP | 0 823 407 A2 | 2/1998 |
| FR | 2 736 632 | 1/1997 |
| WO | 93/20256 | * 10/1993 |

* cited by examiner

*Primary Examiner*—Deborah Jones
*Assistant Examiner*—A. Piziali
(74) *Attorney, Agent, or Firm*—Pennie & Edmonds LLP

(57) ABSTRACT

A transparent substrate according to the invention, especially made of glass, provided on at least one of its faces with an antireflection coating, which includes a single thin layer formed from at least two materials of different refractive index, the composition of which thin layer varies continously through its thickness e.

22 Claims, 2 Drawing Sheets

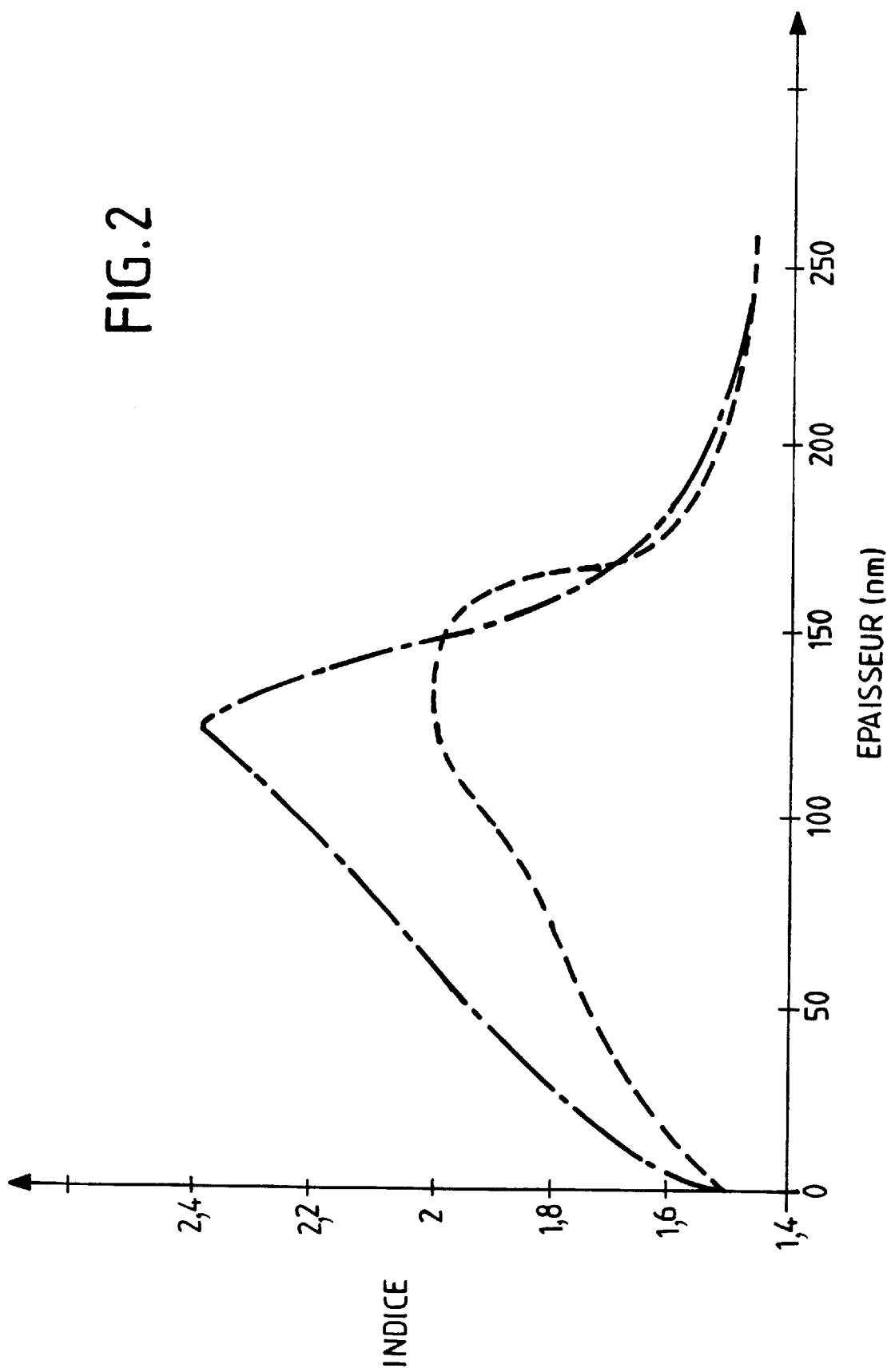

TRANSPARENT SUBSTRATE COMPRISING AN ANTIREFLECTION COATING

BACKGROUND OF THE INVENTION

The invention relates to a transparent substrate, especially made of glass, intended to be incorporated into glazing and provided, on at least one of its faces, with an antireflection coating.

An antireflection coating usually consists of a stack of interferential thin layers, generally an alternation of layers based on a dielectric material having high and low refractive indices. The purpose of such a coating, deposited on a transparent substrate, is to reduce its light reflection, and therefore to increase its light transmission. A substrate coated in this way therefore has its transmitted light/reflected light ratio increased, thereby improving the visibility of objects placed behind it. When it is desired to achieve the maximum antireflection effect it is then preferable to provide both faces of the substrate with this type of coating.

One useful application is in the equipping of buildings. Glazing with an antireflection effect is, according to this application, used, for example, as shop windows so as to better distinguish objects placed behind the window, even in configurations in which the interior lighting is low compared with that outside. It may also be used as counter glass.

Recently, another application has been envisaged, especially at the request of motor-vehicle manufacturers. This is to give a windscreen an antireflection effect while still meeting the requirements in force which insist on high levels of light transmission, generally greater than 75%, and a very low residual haze (less than 1% of the transmitted light). The desired antireflection effect may, for example, consist in increasing the light transmission $T_L$, which amounts to improving the visual comfort of the driver and his passengers. This also reduces the undesirable reflections which may hinder the driver, particularly the reflection of equipment inside the vehicle.

Hitherto, this application has not been developed to any great extent because of the fact that the level of mechanical and chemical durability required is difficult to achieve.

This is because the antireflection coating in the windscreen is placed at least on the 1 face, that is to say that face of the windscreen facing out of the passenger compartment.

However, that face of the windscreen is exposed to a number of stresses. Thus, the to-and-fro movement of the windscreen wipers when they are operating results in significant abrasion, and the impingement of various particles—dust or chippings—damages the coating in places, both from a mechanical standpoint and a chemical (corrosion) standpoint.

To solve these problems and therefore to develop glazing with an antireflection coating that has sufficient mechanical and chemical durability, for the purpose of being used as a windscreen, the Applicant has already proposed in document WO 97/43224 that at least some of the layers forming part of the antireflection stack of layers of materials having alternately high and low refractive indices be layers deposited by a pyrolysis technique.

This stack is not completely satisfactory since, because of the very fact that there is a large number of interfaces, the risk of the stack being fragile cannot be entirely avoided.

SUMMARY OF THE INVENTION

The object of the invention is therefore to propose an antireflection coating having improved mechanical performance, especially for the purpose of using the glazing which is provided with it as a motor-vehicle windscreen.

To do this, the subject of the invention is a transparent substrate, especially made of glass, provided on at least one of its faces with an antireflection coating A, characterized in that said coating consists of a single thin layer formed from at least two materials of different refractive indices, the composition of which thin layer varies continuously through its thickness. Preferably, the thin layer defined above has a geometrical thickness of between 100 and 400 nm.

Advantageously, this layer has at least one first region in its thickness (that region closest to the substrate) in which the refractive index increases and at least one second region (especially that closest to the atmosphere) in which the refractive index decreases. Between these two regions, there may also be an intermediate region of a relatively constant refractive index. Thus, it is possible to have a first region in which the index varies from the value I(0) of approximately 1.45 to 1.65 to the value I(1) of at least 2, especially 2.1 to 2.4, then an optional second region which is very thin compared with the first, in which the index remains approximately at the value I(2) and then a final region in which the index decreases again towards a value I(3), which may be closer to I(1) or may be slightly less than it. The particular feature of this layer is that the index changes gradually, so that this really acts as a monolayer. More complex index variations are also possible (more than two alternations of increasing index region and of decreasing index region).

Because of its actual construction, the antireflection coating according to the invention makes the glazing perfectly suited to use as a motor-vehicle windscreen.

Moreover, the mechanical integrity of the continuous layer allows it to undergo the curving operation without any difficulty.

Furthermore, the antireflection coating according to the invention has a very effective ultra-violet filtration effect, particularly in the wavelength range lying between 400 and 500 nanometers. This effect is advantageously combined with that of the thermoplastic, such as PVB, used as interlayer in the laminated glazing.

This thus avoids, even more effectively, the risk of the plastics and paints present inside the passenger compartment of the motor vehicle fading.

Advantageously, the layer is formed only from two materials of different refractive index.

According to this embodiment, the thin layer is preferably based on $SiO_xN_y$ where x and y vary continuously through its thickness from 0 to 2 and from 0 to 1.33, respectively.

Still according to this embodiment, it is also preferable in that region of the layer which lies closest to the interface with the ambient environment, such as the air, for x to vary in a strictly increasing manner from 0 to 2 and for y to vary in a strictly decreasing manner from 1.33 to 0.

According to another embodiment, the thin layer according the invention is based on $Si_zTi_{1-z}O_2$ where z varies in a strictly continuous manner through its thickness from 0 to 1.

Preferably, in that reiogion of the layer which lies closest to the interface with the ambient environment, z varies in a strictly increasing manner from 0 to 1.

In order to optimize the antireflection effect of the graded-index "monolayer" according to the invention, the reflective index of the thin layer preferably lies between 1.35 and 1.75, advantageously between 1.38 and 1.70, in that region which lies at a distance of between 0 and 10 nanometers from the interface with the ambient environment, such as the air.

The characteristics defined above allow the glazing provided with the substrate according to the invention to fully meet the necessary requirements of the windscreen application, namely the combination of an $R_L$ value of less than 7%, and even less than 6%, at normal incidence and less than 10% at an angle of incidence of 60°, and a $T_L$ value of at least 75% at normal incidence.

It is also possible, according to the invention, to choose one of the materials used in the composition of the graded-index "monolayer" so that it provides a hydrophobic function on the external side of the substrate.

The substrate according to the invention is advantageously provided on that face not having the antireflection coating with a stack of thin layers which includes at least one functional layer, for example made a metallic functional layer of the silver type.

As to the type of stack, this may be a stack with the following sequence:

dielectric/silver/dielectric or dielectric/silver/dielectric/silver/dielectric.

For more details concerning these types of stack, reference may be made to European Patent Applications EP-A-0,678,484, EP-A-0,645,352 and EP-A-0,635,528.

It is also possible to use stacks comprising a reflecting and/or filtering layer, such as a nitride layer, for example titanium nitride, as described in Applications EP-A-0,638,527 and EP-A-0,650,938.

The thickness of the metallic functional layer may be between 20 and 25 nanometers so as to give it solar-protection properties.

The preferred sequence of the stack is as follows:

glass/$Si_3N_4$/ZnO/Ag/Ti/ZnO/$Si_3N_4$/ZnO/Ag/Ti/ZnC/$Si_3N_4$.

One embodiment may consist in depositing this type of stack directly on a flexible transparent substrate, such as one made of polyethylene terephthalate (PET). This may be the product X1R 70®, sold by Southwall.

It is also possible to deposit, on that face of the glazing not having the layer of the invention, a photocatalytic anti-fouling layer based on $TiO_2$, as described in Patents WO 97/10185 and WO 97/10186.

The invention also relates to laminated glazing which includes at least one substrate as defined above.

Such glazing may include tow transparent substrates, especially glass substrates, joined together by a thermoplastic insert comprising at last one sheet of polyvinyl butyral (PVS), that transparent substrate not having the antireflection coating A itself including, on at least one of its faces, an antireflection coating A', preferably deposited using a magnetron sputtering technique.

This coating A' preferably has the following sequence:

glass/$SnO_2$/$SiO_2$:Al/$Nb_2O_6$/$SiO_2$:Al.

The dielectric $Nb_2O_6$ may advantageously be partially or completely replaced with a material having similar optical properties, such as $TiO_2$ for the purpose of making it easier to deposit the final layer of the stack.

Advantageously, the antireflection coating A is on the 1 face and the antireflection coating A' is on the 4 face.

Such laminated glazing is perfectly suited to use as a motor-vehicle windscreen. It is also suited to use a glass for protecting photographic images or paintings.

Moreover, it may be noted that the antireflection coating according to the invention may also apply to so-called asymmetrical laminated glazing assemblies, comprising at least one glass substrate and at least one sheet of polymer having energy-absorption properties, such as polyurethane The choice of the nature of the glass substrate(s) making up the glazing may also prove to be important: the optical and/or thermal properties intrinsic to the glass substrate(s) may be combined with the optical properties of the antireflection coating(s) in order to obtain glazing having overall the desired performance.

Thus, the substrates may be chosen to be made of clear glass, for example such as those sold under the commercial name "Planilux" by Saint-Gobain Glass. The additional effect of increasing the light transmission of the antireflection coating(s) therefore makes it possible to obtain glazing which is extremely transparent.

However, it is also possible to choose the substrates making up the glazing to be made of glass having reduced energy transmission properties, especially bulk-tinted glass. At the cost of a certain drop in the light transmission, useful solar-protection glazing is obtained, the effect of increasing the light transmission obtained by virtue of the antireflection coating(s) advantageously allowing this reduction in level of transparency to be moderated. Such bulk-tinted glazing, especially suitable for windscreens, is sold, for example, under the name "Sekurisol" or "Thermocontrol" by Sekurit Saint-Gobain. Other types of glass having reduced energy transmissions are also useful within the context of the present invention.

These are, especially, bronze-coloured glasses, as described in U.S. Pat. No. 4,190,542 and U.S. Pat. No. 4,101,705, or glasses whose composition has been adjusted more for the purpose of motor-vehicle glazing applications. These are, for example, glasses called $TSA^+$ or $TSA^{++}$, the content of colouring oxides, of the $Fe_2O_1$, FeO and CoO type, of which is adjusted so as to have a selectivity defined by the $T_L/T_E$ ration of less than 1.30 or even 1.40 to 1.50, and a tint within the greens. For more details, reference may advantageously be made to European Patent Application EP-A-0,616,883. Briefly recalled below is the content of the aforementioned colouring oxides in the glass compositions according to the teaching of that patent (in proportions by weight).

According to a first series:

| | |
|---|---|
| $Fe_2O_3$ | 0.55 to 0.62% |
| FeO | 0.11 to 0.16% |
| CoO | 0 to 12 ppm especially < 12 ppm with especially, the $Fe^{2+}$/Fe ratio of the order of 0.19 to 0.25. |

According to a second series:

| | |
|---|---|
| $Fe_2O_3$ | 0.75 to 0.90% |
| FeO | 0.15 to 0.22% |
| CoO | 0 to 17 ppm especially < 10 ppm with especially, the $Fe^{2+}$/Fe ratio of the order of 0.20. |

The glasses may also be bulk-tinted glasses, especially those tinted in the blue-green, such as those described in Patent Applications EP-A-0,644,164, Wo 95/00828 or WO 96/00394.

All these types of tinted-glass composition may therefore advantageously be chosen so that the glazing has energy transmission values of between 30 and 70%, especially between 35 and 60%, and light transmission values of between 50 and 85%.

Finally, the invention relates to a process for manufacturing a transparent substrate, especially made of glass, provided on at least one of its faces with an antireflection coating A comprising at least one thin layer of thickness e deposited using a radiofrequency or microwave plasma CVD technique using at least two precursors over a time t. According to the invention, at least one deposition parameter is varied continuously over the time t.

The expression "deposition parameter" should be understood to mean, within the context of the invention, one of the following deposition conditions used in the plasma CVD technique: deposition pressure, radiation power, precursor flow rates, substrate temperature, electrical voltage on the substrate.

According to a highly advantageous characteristic, the deposition parameter that is varied over the time t is the flow rate of at least one of the two precursors.

According to another variant of the invention, the antireflection coating of the invention A may also be deposited using another vacuum technique. Preferably, this is sputtering, especially sputtering assisted by a magnetic field. Since oxides are involved, it is possible to choose reactive sputtering with an oxidizing agent in the deposition atmosphere. It is also possible to deposit the coating by CVD not assisted by a plasma, as described, for example, in the French Patent FR 95/08421 of Jul. 12, 1995.

BRIEF DESCRIPTION OF THE DRAWING

Further details and advantageous characteristics will emerge below from reading the detailed description of the following nonlimiting examples, given with reference to FIGS. 1 to 3 which show respectively:

FIG. 2: two curves representative of the refractive index gradient of the layer according to the invention;

DETAILED DESCRIPTION OF THE INVENTION

EXAMPLE 1

Figure 1:
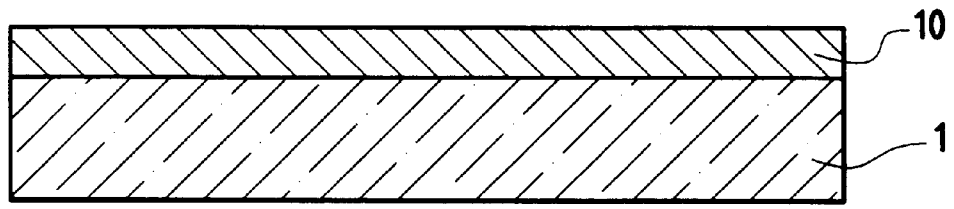
FIG. 1: a glass substrate provided, on one of its faces, with an antireflection coating in accordance with the invention.

FIG. 1 shows a glass substrate of the "Planilux" type which is provided, on one of its faces, with a layer 10 based on $SiO_xN_y$ approximately 250 nm in thickness, x and y varying continuously through the thickness. This variation results in the profile shown by the dotted curve in FIG. 2.

In order to obtain a graded-index layer the plasma CVD technique is used at a radiofrequency of 13.56 MHz, as described below.

Argon is introduced into a chamber in which a vacuum has been created, allowing the pressure to be established at approximately 26.7 Pa. The radiation power is 100 watts.

The chamber used (not shown) has four ports each connected to a line. A plasma gas or an organosilicon gas can be introduced via each of these lines.

In order to carry out the deposition according to the invention, the flow rate of one of the components of the plasma gas was varied continuously over time, as will be described now.

It should be pointed out that the flow rates are given under the normal temperature and pressure conditions.

At time t=0, the following were introduced: a stream of silane $SiH_4$ at flow rate of 30 $cm^5$/minute, a stream of nitrogen protoxide $N_2O$ at a flow rate of 100 $cm^5$/minute and a stream of argon at a flow rate of 50 $cm^3$minute.

Over the time necessary for depositing the first half of the thickness of the layer, the flow rate of the nitrogen protoxide $N_2O$ was varied continuously from 100 to 0 $cm^3$/minute and, at the same time, the flow rate of ammonia $NH_3$ was varied continuously from 0 to 90 $cm^3$/minute, the silane and argon flow rates remaining unchanged and equal to the initial flow rates.

Over the time needed to deposit the other half of the thickness of the layer, the flow rate of nitrogen protoxide $N_2O$ was conversely, varied continuously from 0 to 100 $cm^3$/minute and, simultaneously, the flow rate of ammonia $NH_3$ was conversely, varied continuously from 90 to 0 $cm^3$/minute, the silane and argon flow rates remaining unchanged.

The curves in FIG. 2 each show the variation in refractive index through the thickness of a layer according to the invention, this variation being optimized by a minimum light reflection at 0° angle of incidence.

The dotted-line curve relates to the layer obtained from the aforementioned mixtures; the broken-line curve relates to a layer obtained in a similar manner to the previous one, but using a second, different mixture. This mixture comprised $Ti(OC_3H_7)_4$ as titanium organometallic precursor and oxygen $O_2$.

The perfectly continuous profile of these curves shows the lack of interfaces, which are sources of fragility.

In order to assess the mechanical durability of the layer according to the invention, the glass substrate of FIG. 1 was subjected to two abrasion-resistance test.

The first test (A), called the Taber test, was carried out using a grinding wheel made from an abrasive powder embedded in elastomer, produced by a machine manufactured by Taber Instrument Corp. (which machine is referred to as "Standard Abrasion Tester" model 174). The grinding wheel is of the CO 10F type and used with a load of 500 grams, one cycle being one complete rotation of the grinding wheel on itself.

The second test (B) is carried out by subjecting the substrate to a wipe by a windscreen wiper. The force applied by the wiper to the substrate is approximately 45 N and the wiping rate is 111 cycles/minutes, one cycle being a forward-and-back movement of the wiper. The hardness of the wiper is about 70 Shore A.

COMPARATIVE EXAMPLE 2

By way of comparative example, a stack of the type: glass/$SiON$/$Si_3N_4$/$SiO_2$ was produced using a sputtering deposition technique, in which stack the layer thicknesses were adjusted so as to obtain spectrophotometric values very close to those obtained by virtue of the glass substrate according to the invention, that is to say, inter alia with a light reflection value $R_L$ of less than 5%.

This stack was then subjected to the same abrasion-resistance tests as those described above.

Table 1 below gives the visual observations made, after a certain number of cycles, on the substrates that have undergone the two tests (A) and (B) mentioned above.

TABLE 1

|  | Number of cycles | Example 1 according to the invention | Comparative Example 2 |
|---|---|---|---|
| Test (A) | 500 | Surface scratches | Onset of delamination of the $SiO_2$ layer |
|  | 1500 | Isolated, sometimes deep, scratches | $SiO_{2\ layer\ removed}$ |
|  | 3000 | Surface damaged by transverse scratches | $Si_3N_4$ layer removed |
| Test (B) | 1.5 million | No scratches | First scratches |
|  | 2.3 million | Very fine scratches | Very dense scratches |

This table clearly shows that the layer according to the invention exhibits much greater mechanical durability than the stack produced in the Comparative Example.

Figure 3:
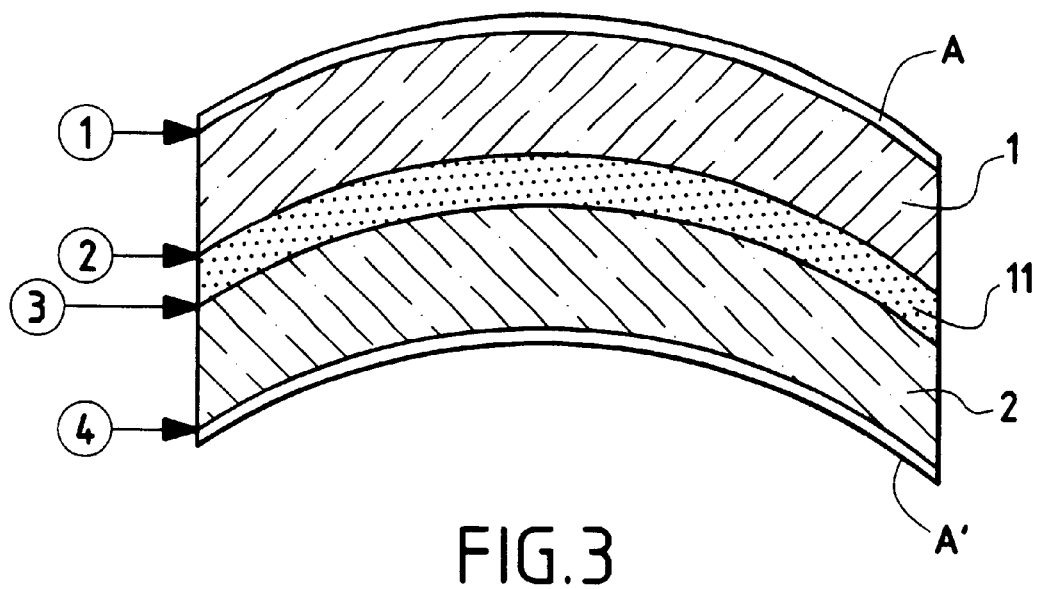
FIG. 3: laminated glazing comprising two antireflection coatings and a stack comprising low-emissivity layer.

Examples 3 and 4 use two clear glass substrates 1, 2 of the Planilux type, having a thickness of 2.6 and 2.1 mm respectively, joined together by a sheet of PVB 11 with a thickness of 0.76 mm. The examples are aimed particularly at a laminated windscreen application for motor vehicles. In this application, the two substrates 1, 2 are firstly provided with their stack(s) and then curved, the substrate 1 having its outer surface 1 convex and the substrate 2 having its outer face 4 concave, as shown in FIG. 3.

EXAMPLE 3 ACCORDING TO THE INVENTION

The substrate 1 is coated on its outer face 1 with the layer 10 according to the invention.

The substrate 1 is coated on its inner face 2 with a solar-protection stack according to the one described in Patent Application EP-A-0,718,250, the sequence of which is as follows:

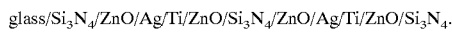

glass/$Si_3N_4$/ZnO/Ag/Ti/ZnO/$Si_3N_4$/ZnO/Ag/Ti/ZnO/$Si_3N_4$.

The thicknesses of the corresponding layers are given in Table 2 below, in nanometers:

TABLE 2

| $Si_3N_4$ | 17 |
|---|---|
| ZnO | 17 |
| Ag | 9 |
| Ti | 1 |
| ZnO | 10 |
| $Si_3N_4$ | 50 |
| ZnO | 25 |
| Ag | 9 |
| Ti | 1 |
| ZnO | 10 |
| $Si_3N_4$ | 25 |

The substrate 2 is also coated on its outer face 4 with an antireflection stack deposited using a magnetron sputtering technique, like the one described in Patent Application EP-A-0,728,712, the sequence of which is as follows:

glass/$SnO_2$/$SiO_2$:Al/$Nb_2O_5$/$SiO_2$:Al.

The thicknesses of the corresponding layers are given in Table 3 below in nanometers:

TABLE 3

| $SnO_2$ | 18 |
|---|---|
| $SiO_2$:Al | 38 |
| $Nb_2O_5$ | 102 |
| $SiO_2$:Al | 87 |

COMPARATIVE EXAMPLE 4

The substrate 1 used does not include thin layers.

The substrate 2 is coated only on its inner face 3 with the same solar-protection stack as in Example 2.

Table 4 below gives, for Examples 3 and 4, the spectrophotometric values, expressed as percentages, measured at zero angle of incidence, the values a* and b* being measured in reflection at the 1 face.

TABLE 4

|  | Example 3 according to the invention | Comparative Example 4 |
|---|---|---|
| $T_L$ | 82.9 | 76.8 |
| $R_L$ | 3.1 | 9.2 |
| $T_E$ | 47.0 | 44.6 |
| $R_E$ | 31.6 | 34.0 |
| a* | −4.6 | −2.7 |
| b* | −18.1 | −8.2 |

In this table, it may be seen that the value of the light transmission $T_L$ is markedly improved by means of the layer according to the invention. It is therefore possible, for a given light transmission value, to increase the thickness of the silver layer(s) and therefore improve the solar-protection performance of this type of laminated glazing.

EXAMPLE 5 ACCORDING TO THE INVENTION

The substrates 1 and 2 have a composition according to the teaching of Patent EP-A-0,644,164 and have, more specifically, the following oxides in the proportions by weight given below:

| $SiO_2$ | 70.8% |
|---|---|
| $Al_2O_3$ | 0.6% |
| CaO | 9.50% |
| MgO | 4.10% |
| $Na_2O$ | 13.8% |
| $K_2O$ | 0.10% |
| $Fe_2O_3$ | 0.86% |
| $TiO_2$ | 0.035% |
| FeO | 0.28% |
| $SO_3$ | 0.10% |

The substrate 1 has the layer according to the invention on its outer, 1 face.

The glass substrate 2 is coated on its outer, 3 face with an antireflection stack identical to that relating to Example 3.

COMPARATIVE EXAMPLE 6

The same substrates as those used in Example 5 are used, but without any coating.

Table 5 below gives, for Examples 5 and 6, the spectrophotometric values measured at zero angle of incidience, the values a* and b* being measured in reflection at the 1 face.

TABLE 5

| | Example 5 according to the invention | Comparative Example 6 |
|---|---|---|
| $T_L$ | 77.1 | 71.2 |
| $R_L$ | 0.9 | 6.9 |
| $T_E$ | 42.2 | 41.0 |
| $R_E$ | 5.1 | 5.4 |
| a* | −2.3 | −3.2 |
| b* | −6.3 | −0.4 |

Again, it may be seen that, by comparing the results of the two examples, there is a marked improvement in the light transmission $T_L$. It is therefore possible here again to envisage, for a given value of $T_L$, tinting one of the two substrates more strongly and therefore improving the selectivity.

What is claimed is:

1. Transparent substrate provided on at least one of its faces with an antireflection coating A that is exposed to the external environment, wherein the antireflection coating consists of a single thin layer formed from at least two materials of different refractive indices, the composition of which thin layer is based on either $SiO_xN_y$ or on $Si_zTi_{1-z}O_2$ and varies continuously through its thickness.

2. Substrate according claim 1, wherein the thin layer has a thickness of between 100 and 400 nm.

3. Substrate according to claim 1, wherein the thin layer is formed only from two materials of different refractive index.

4. Substrate according to claim 3, wherein the thin layer is based on $SiO_xN_y$ where x and y vary continuously through its thickness from 0 to 2 to 1.33, respectively.

5. Substrate according to claim 4, wherein, in a region of the layer which lies close to the interface with the ambient environment, x varies in a strictly increasing manner from 0 to 2 and y varies in a strictly decreasing manner from 1.33 to 0.

6. Transparent substrate provided on a least one of its faces with an antireflection coating A, wherein the antireflection coating consists of a single thin layer formed from at least two materials of different refractive indices, the composition of which thin layer is based on $Si_zTi_{1-z}O_2$ where z varies in a strictly continuous manner through its thickness from 0 to 1.

7. Substrate according to claim 6, wherein, in a region of the layer which lies close to the interface with the ambient environment, z varies in a strictly increasing manner from 0 to 1.

8. Substrate according to claim 1, wherein the refractive index of the thin layer lies between 1.35 and 1.75 in that region which lies at a distance of between 0 and 10 nanometers from the interface with the ambient environment.

9. Substrate according to claim 1, wherein the substrate is provided on that face not having the antireflection coating with a stack of thin layers including at least one silver layer.

10. Substrate according to claim 9, wherein the thickness of the silver layer is between 20 and 25 nanometers.

11. Substrate according to claim 9 or 10, wherein the stack of thin layers has the following sequence:

glass/$Si_3N_4$/ZnO/Ag/Ti/ZnO/$Si_3N_4$/ZnO/Ag/Ti/ZnO/$Si_3N_4$.

12. Laminated glazing which includes at least one substrate according to claim 1.

13. Glazing according to claim 12, wherein the glazing includes two transparent substrates joined together by a thermoplastic insert comprising at least one sheet of polyvinyl butyral, and wherein the transparent substrate not having the antireflection coating A itself includes, on at least one of its faces, an antireflection coating A'.

14. Glazing according to claim 13, wherein the antireflection coating A' has the following sequence:

glass/$SnO_2$/$SiO_2$:Al/$Nb_2O_5$ or $TiO_2$/$SiO_2$:Al.

15. Glazing according to claim 13 or 14, wherein the antireflection coatings A and A' are provided on each outer face of each transparent substrate at each outer edge of the stack.

16. A motor vehicle windscreen comprising the laminated glazing according to claim 12.

17. An image protection device for paintings or photographs comprising the laminated glazing according to claim 12.

18. The transparent substrate of claim 1, wherein the thin layer has a first region wherein the refractive index of the first region increases and a second region wherein the refractive index of the second region decreases.

19. The transparent substrate of claim 18, wherein the refractive index of the first region increases from a first value of between about 1.45 and 1.65 to a second value of greater than 2 and the refractive index of the second region decreases from the second value to a third value of between about 1.45 and 1.65.

20. The transparent substrate of claim 19, wherein the second value is from 2.1 to 2.4.

21. The transparent substrate of claim 19, further comprising an intermediate region having a relatively constant refractive index between the first region and the second region.

22. The transparent substrate of claim 21, wherein the refractive index of the first region increases from a first value of between about 1.45 and 1.65 to a second value of greater than 2, the refractive index of the intermediate region is the second value, and the refractive index of the second region decreases from the second value to a third value of between about 1.45 and 1.65.

* * * * *

UNITED STATES PATENT AND TRADEMARK OFFICE
CERTIFICATE OF CORRECTION

PATENT NO. : 6,387,515 B1
DATED : May 14, 2002
INVENTOR(S) : Joret et al.

It is certified that error appears in the above-identified patent and that said Letters Patent is hereby corrected as shown below:

<u>Column 9,</u>
Line 35, replace "from 0 to 2 to 1.33" with -- from 0 to 2 and from 0 to 1.33 --.

<u>Column 10,</u>
Line 15, replace "butyral" with -- butyral (PVB) --.

Signed and Sealed this

Seventeenth Day of September, 2002

Attest:

Attesting Officer

JAMES E. ROGAN
*Director of the United States Patent and Trademark Office*